Oct. 27, 1964     G. B. FOSTER     3,154,685
SELECTIVE RAY ENERGY UTILIZATION IN RADIATION GAUGING
SYSTEMS HAVING SPECTRAL-ENERGY RAY SOURCES
Filed May 5, 1961
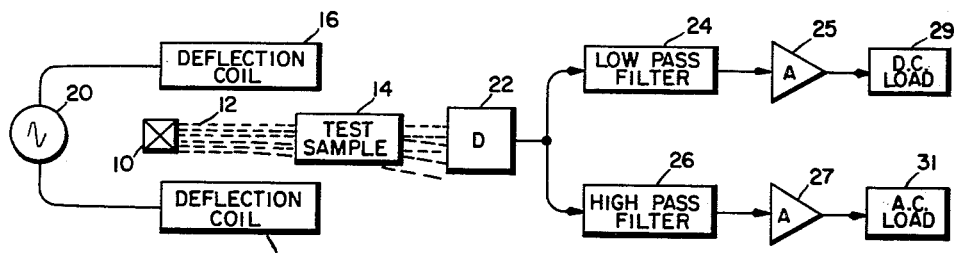
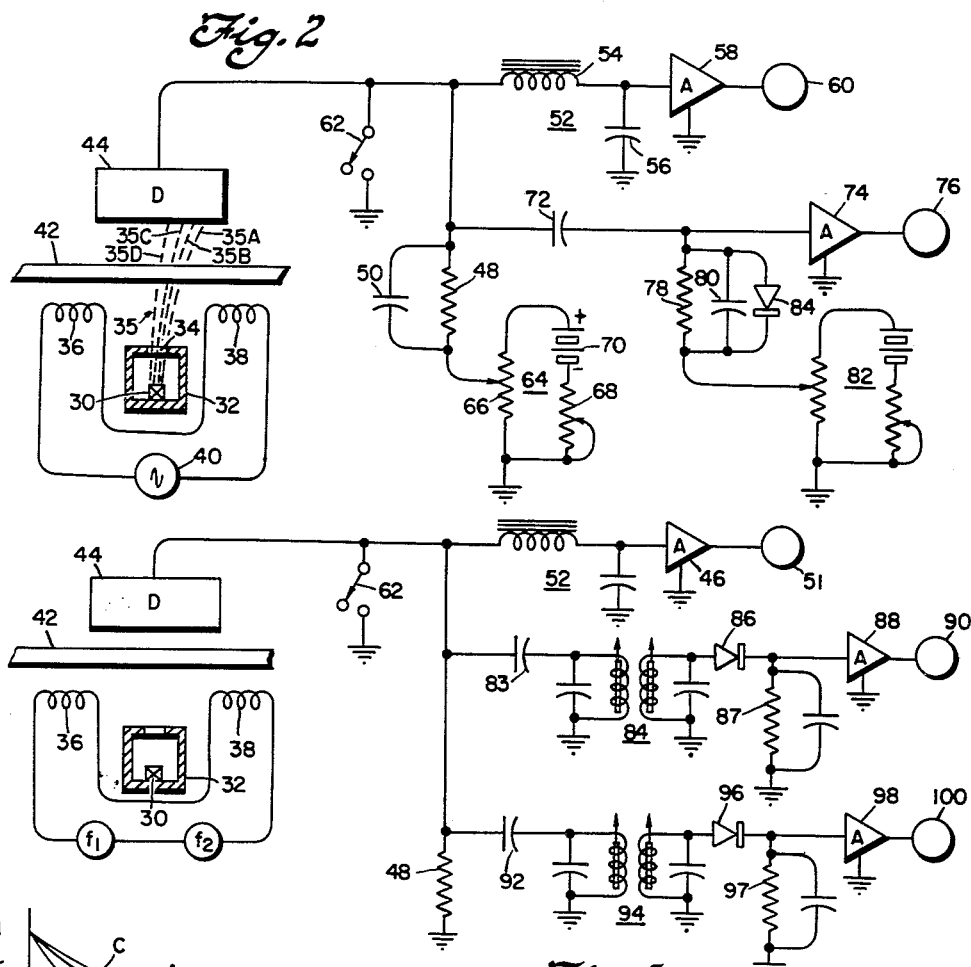
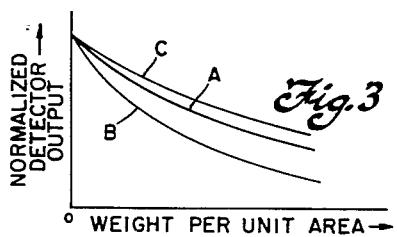
INVENTOR
George B. Foster
By Anthony D. Cennamo
ATTORNEY United States Patent Office 3,154,685
Patented Oct. 27, 1964

3,154,685
SELECTIVE RAY ENERGY UTILIZATION IN RADIATION GAUGING SYSTEMS HAVING SPECTRAL-ENERGY RAY SOURCES
George B. Foster, Worthington, Ohio, assignor to Industrial Nucleonics Corporation, a corporation of Ohio
Filed May 5, 1961, Ser. No. 108,135
7 Claims. (Cl. 250—83.3)

This invention pertains generally to methods and apparatus for using sub-atomic particles in gauging physical characteristics of materials and particularly to methods and apparatus for using beta particles for such purposes.

It has been known for some years that, if a test sample of a material is irradiated by beta particles from a radioactive source, physical characteristics of the material, as thickness or weight per unit area, may be measured by observing the number of beta particles which pass through the test sample. Many considerations affect the selection of the particular redioactive material to be used as a radioactive source. Availability, half-life and specific activity of known radioactive materials, to list a few of such considerations, restrict selection to a comparatively small number of radioactive materials.

Another important consideration affecting selection of a radioactive source material is the fact that each one of the known radioactive materials has a characteristic energy spectrum, that is, beta particles having different energy levels are emitted from known radioactive materials. The characteristic energy spectrum of different radioactive materials, in turn, determines the usefulness of each material as a source of beta particles in different applications. For example: strontium 90 emanates relatively high energy beta particles which are most suited for measuring materials having a relatively great thickness or mass per unit area; carbon 14 emanates low energy beta particles suitable for measuring very thin materials or materials having a very low weight per unit area; and, caesium 134 emanates particles having energy intermediate to strontium 90 and carbon 4. Low energy beta particles, which are most adapted to measuring thin foils or materials of very low weight per unit area, are not too well adapted to measurement of thick materials or materials having a very high weight per unit area. Conversely, high energy beta particles are best adapted to measuring heavy or thick materials and are not too well adapted to measuring thin or light materials. Consequently, it has been standard practice to use different materials for radioactive sources to provide beta particles having an energy spectrum best adapted to the physical characteristics of the particular material expected to be tested. Such an expedient places limitations on test equipment and should be avoided, it obviously being preferable that a single radioactive source be useful to measure many different kinds or thicknesses of material.

It is an object of this invention to provide method and apparatus for extending the range of usefulness of radioactive sources used in gauging equipment.

Another object of the invention is to provide means for modifying the effective energy spectrum of radioactive sources in gauging equipment.

Still another object of the invention is to provide means whereby a radioactive source having a high energy spectrum may be made to appear to have the characteristics of a radioactive source having a low energy spectrum.

Further objects and features of my invention will be best understood and appreciated from a detailed description of embodiments thereof, selected for purposes of illustration and shown in the accompanying drawings, in which:

FIG. 1 is a block diagram illustrating the manner in which I attain the purposes of my invention;

FIG. 2 is a schematic representation of a preferred embodiment of my invention, showing means for amplifying simultaneously both the D.C. and A.C. components of an electrical signal from a radiation detector;

FIG. 3 is a graph showing the relative amplitudes of the electrical signals produced by the two amplifiers shown in FIG. 1, with weight per unit area of a material under test as the abscissa, the beta particles in the measuring beam having been subjected to a typical electromagnetic field; and, FIG. 4 is a schematic representation of an alternative embodiment of my invention, showing particularly means to accomplish the modulation of beta particles from a radioactive source by two modulation sources.

Referring now to FIG. 1, a radioactive source 10, preferably one emanating beta particles and having a long half-life, as well as a high specific activity provides a beam 12 of beta particles. Strontium 90 is a radioactive material which meets the foregoing criteria. However, regardless of the particular known radioactive material used, it will be found that the energy of the individual particles are distributed about a mean value in a characteristic energy spectrum. The beam 12 of beta particles is directed to a test sample 14 of the material to be measured. A portion of the beta particles impinging on the test sample 14 is absorbed therein, the number of particles absorbed being proportional to a physical charracteristic of the test sample, as thickness or weight per unit area. It follows, then, that the number of beta particles in the beam 12 after passing through the test sample 14 is a measure of the particular physical characteristic being measured. Before impinging on the test sample 14, the beam 12 is subjected to the influence of a time-varying transverse electromagnetic field formed between a pair of electromagnetic coils 16, 18 energized by a time-varying drive 20 whereby the beta particles having different energies are differentially deflected. That is, low energy beta particles in the beam 12 are deflected more than high energy particles. The strength of the electromagnetic field is adjusted as desired so that all deflected beta particles having energy below a predetermined level are periodically swept beyond the sensitive face of a radiation detecting and translating device, hereinafter referred to as the radiation detector 22. Any known radiation detector, as an ionization chamber may be used. Thus, the electrical output of the radiation detector 22 is an electrical signal having two components, the first being a direct current proportional to the number of beta particles having energy above the predetermined level and the second component being an alternating current superimposed on the first component and having an amplitude proportional to the number of beta particles periodically deflected beyond the face of the radiation detector 22. Considering the two components of the electrical signal from another view, the first component is similar to the electrical signal output of the radiation detector which would have resulted had the radiation detector been energized by beta particles from a radioactive source having a higher energy emission spectrum than the source actually used. Likewise, the second component corresponds to the electrical signal output of the radiation detector had it been energized by beta particles from a radiation source having a lower energy emission spectrum than the source actually used. The two components are separated by any known means, as a low pass filter 24 and a high pass filter 26, amplified respectively in a D.C. amplifier 25 and an A.C. amplifier 27 and used to energize separate loads, which may be electrical indicators 29, 31.

It is noted here that, for simplicity, the drawing has been distorted in some respects, the better to show the invention. For example, it will be recognized that the curvature of beta particles actually imparted by an electromagnetic field between electromagnetic coils disposed as shown would be in a plane perpendicular to the sheet rather than as illustrated. In addition, only the trajectory of beta particles has been represented, it being understood that a beam of other kinds of radioactive emanations, as a beam of alpha particles, may be used in place of a beam of beta particles.

FIG. 2 shows a radioactive source 30, as strontium 90, supported in a shield 32, one side of the shield 32 having a window 34 formed therein. It is understood, of course, that the relative position of the source 30 and the window 34 and the dimensions of the window 34 may be varied within wide limits as desired, so long as a substantially collimated beam 35 of beta particles is produced. Representative ones of the trajectories of the beta particles which pass through the window 34 in the shield 32 are represented by the numerals 35A, 35B, 35C, and 35D. A pair of electromagnetic coils 36, 38 are supported outside the window 34 in any convenient manner so that a time-varying electromagnetic field may be established for reacting with beta particles passing therethrough in accordance with the energy of each beta particle. Thus, at a given instant, the numeral 35A represents the trajectory of a beta particle having a low energy, numeral 35D represents the trajectory of a beta particle having a high energy and numerals 35B and 35C represent the trajectories of beta particles of intermediate energy. The electromagnetic coils 36, 38 are connected to a source 40 of alternating current so that the adjacent poles of the two coils alternate between one being a north pole and the other a south pole. Consequently, beta particles passing between the electromagnetic coils 36, 38 are deflected, the amount of deflection being a function of the energy in each particle and the instantaneous strength of the deflecting field. That is, the maximum deflection of beta particles with low energy is greater than the maximum deflection of beta particles having high energy, for a purpose to be described in detail hereinafter. Further, since an alternating current is applied to the electromagnetic coils 36, 38, a time-varying electromagnetic field is produced, causing the beam 34 also to oscillate.

A test sample 42 which, in a practical case may consist of a continuously moving web or foil of material to be measured, is supported by any convenient means (not shown) in the path of the beam 35 of beta particles. A portion of the beta particles in the beam 35 are selectively absorbed by the test sample 42, the number absorbed depending upon the thickness, or the weight per unit area thereof, and the energy of each individual particle. The beta particles which pass through the test sample 42 are directed toward a radiation detector 44, which element may be an ionization chamber or, alternatively, may consist of a luminescent material in combination with a photo cell. All the beta particles which pass through the test sample 42, do not impinge upon the radiation detector 44. A portion of such beta particles, the beta particles having a relatively low energy, are deflected by the time-varying field between the electromagnetic coils 36, 38 periodically so that they do not impinge upon the radiation detector 44. Such periodic deflection of beta particles causes the radiation detector 44 to have a time-varying output signal, even when the test sample 42 is invariable or there is no test sample in measuring position. It will be noted, however, that, unless the beam 35 is deflected to such an extent that even the beta particles having high energy are deflected beyond the face of the radiation detector 44, the time-varying signal output of the radiation detector 44 is superimposed on a steady signal.

Since the output signal of the detector 44 is a small electrical current, it is desirable that means be provided to amplify such a signal to drive indicating, recording or control devices. Thus, the output of the radiation detector 44 is led, if the steady, or D.C. component of the electrical signal therefrom is to be amplified in an electron tube amplifier 58, to a load resistor 48. A capacitor 50 may be connected in parallel with the load resistor 48 to smooth out unwanted stochastic variations in the signal output of the radiation detector 44. The load resistor 48, in turn, is connected through a low frequency filter 52, which in one form may consist of a choke coil 54 and a capacitor 56, to the input of a D.C. amplifier 58. After passing through the D.C. amplifier 58, the signal is connected to an output circuit, as a slide-back voltmeter 60. A zero point adjustment preferably is provided by means of a switch 62 which, when closed, shorts out any input signal to the D.C. amplifier 58. In addition, the D.C. amplifier 58 preferably utilized known adjustment means (not shown) to compensate for drift thereof. The operating point for the D.C. amplifier 58 is set by a calibrator 64 by means of which a selected bias voltage may be impressed on the D.C. amplifier 58. Thus, the lower end of the load resistor 48 is connected to the movable arm of a potentiometer 66. The current through potentiometer 66, and consequently, the sensitivity of potentiometer 66 may be adjusted by the setting of a second potentiometer 68 serially connected to a voltage source 70 and the potentiometer 68.

If it is desired to measure the amplitude of the time-varying, or A.C. component of the output of the radiation detector 44, the output signal thereof is led through a coupling capacitor 72, an A.C. amplifier 74 and thence to an output circuit, again as a slide-back voltmeter 76. A separate load resistor 78, capacitor 80, and a calibrator 82, similar in all respects to the calibrator except for the addition of a rectifier 84, is incorporated in circuit with the A.C. amplifier for the same reasons as hereinbefore described.

Referring now to FIG. 3, the effect of modulation may clearly be seen. Curve A shows the variation in output of the radiation detector 44 as a function of the weight per unit area of the test sample 42 as in the prior art. That is, curve A of FIG. 3 is a plot of radiation detector output obtained when a undeflected beam from a radioactive source having a particular specific activity is used. Curve B represents the A.C. component of the signal output of the radiation detector 44 when the beam 35 of beta particles is subjected to an alternating magnetic field of a given frequency and amplitude. Since this output signal results largely from the deflection of low energy beta particles which are less likely to penetrate the test sample 42, curve B falls off more rapidly than curve A as weight per unit area of the target increases. Curve C, however, the D.C. component of the signal output of the radiation detector 44 resulting from high energy beta particles penetrating the test sample 42, falls off more slowly than curve A as the weight per unit area of the test sample increases since the portion of high energy particles absorbed is smaller than for the low energy particles. It will be understood that the curves of FIG. 3 are normalized to a common maximum ordinate value (such as 1.0) for the "no absorber present" condition and the curves do not represent the amplitudes of the actual voltage signals obtained relative to each other.

The foregoing description makes it clear that it is possible to vary the effect of a given radioactive source, as strontium 90, to make it appear that such source has a lower energy emission spectrum than it actually has. This means that a given source, again as strontium 90, may be used to measure thinner or lighter materials than is ordinarily the case. On the other hand, that same source may be made to appear to have a higher energy emission spectrum than it really has, so that same source may be used to measure thicker materials or materials having a greater weight per unit area than is ordinarily done. It will be observed also that the change in the apparent energy emission spectrum of the given radioactive source may be simply varied by varying the amplitude of the time-varying electromagnetic field to which the beta particles are subjected between the source and the detector thereof.

It will also be observed that the particular means to vary the deflection field is not critical to the invention, and that other means different from the means shown may be used without departing from the concepts of the invention. For example, the beta particles may be deflected by the field between rotating permanent magnets instead of by the field between a pair of electromagnetic coils as illustrated. Further, it should be noted that the position of the electromagnetic coils is not critical. In fact, under certain circumstances, it may be preferable to place the coils between the detector and the test sample rather than between the source and the test sample. When this is done, the collimated beam from the source is unaffected by the amount of deflection of the beta particles. This in turn obviates any chance that the results may be in error because the deflected beta particles must pass through a greater thickness of the test sample.

The embodiment illustrated in FIG. 4 is similar to that illustrated in FIG. 2 in that a beam 35 of beta particles from a radioactive source 30 within a shield 32 is directed through an electromagnetic field and then through a test sample 42 to a radiation detector 44. However, the electromagnetic field in this case is generated by simultaneously passing two alternating currents of different frequencies through the electromagnetic coils 36, 38 from sources marked $f_1$ and $f_2$ respectively. The output of the radiation detector 44 in this case is fed through a load resistor 48. The D.C. component of the signal at the upper end of resistor 48 may be taken off through a low pass filter 52, led through a D.C. amplifier 46 and displayed on an indicating instrument 51 in exactly the same manner as was done in FIG. 2. The two alternating components of the signal output of the radiation detector 44 are divided into separate signals. As illustrated, one component of the output signal of the radiation detector 44 (that component having a frequency $f_1$) is led through a coupling capacitor 83 and thence to a tuned circuit 84. Tuned circuit 84 preferably consists of a double tuned transformer tuned in a known manner so that it may pass a band of frequencies centered around frequency $f_1$. The output of tuned circuit 84 is led through a detector 86, an input circuit 87, and an A.C. amplifier 88 to an indicator 90. In a similar manner the second alternating component of the signal output of the radiation detector 44 is led through a separate coupling capacitor 92 to a second resonant circuit 94 (which is similar to tuned circuit 84 except that it is tuned to frequency $f_2$), and thence through a separate detector 96, an input circuit 97, and an A.C. amplifier 98 to an indicating instrument 100.

It will be noted in connection with the A.C. amplifiers described herein that the two frequencies $f_1$ and $f_2$ are different in order to achieve outputs corresponding to two distinct energy bands within the original energy spectrum. It is also noted that modulation could be obtained by feeding separate deflection current sources into separate sets of electromagnetic coils. It is also noted that in gauging of many materials that it is necessary to maintain a fast response. Also it is, of course, good practice to select deflection frequencies which avoid fundamental or harmonic relationship to line frequencies or to each other for obvious reasons. Since it is desirable that the circuit be capable of fast response, the frequency of modulation should be as high as convenient, depending upon the frequency with which variations in the test sample are to be observed. If it is desired to observe variations in the test sample of frequencies up to 100 c.p.s., then an appropriate modulation frequency for the deflection field would be 10 kc. A deflection frequency of 10 kc. is easily obtained, being limited primarily by the time constant of the deflection coils or the radiation detector load, since the beta particles are of such small mass and have low enough speeds readily to be deflected by magnetic fields ordinarily used in electronic circuits.

It should be evident to those having skill in the art that devices other than an indicating instrument may be connected to my circuit. For example, an automatic recorder/controller could very well be substitued for any of the indicating instruments if it is desired to provide means for adjusting a process to keep the thickness or weight per unit area of a test sample constant. In view of the many modifications which may be made to the specific embodiment of the invention described herein without departing from its inventive concepts, it should be understood that the invention is limited only by the scope of the appended claims.

I claim:

1. Apparatus for measuring a physical characteristic of a material, comprising, means for producing a beam of beta particles, individual ones of said beta particles having different energies, time-varying electromagnetic means disposed adjacent said beam differentially to deflect beta particles therein according to the energy of each of said particles, means supporting said material in position to be irradiated by said beam, detecting and translating means disposed to intercept time-varying numbers of said beta particles after passing through said material to produce an electric signal having a steady component and a time-varying component, and means for separating said steady component and said time-varying component to actuate output devices.

2. Apparatus as in claim 1 wherein said time-varying electromagnetic means includes a pair of electro-magnetic coils connected serially to a time-varying current source, the longitudinal axis of each one of said pair of electromagnetic coils being normal to the axis of said beam on opposite sides thereof.

3. Apparatus as in claim 2 wherein said detecting and translating means includes an ionization detector, said ionization detector being disposed in the path of said beam after passing through said material and subtending an angle less than the maximum angle of deflection of some of said beta particles.

4. A measuring system utilizing a radioactive source from which particles having varying energy emanate in an energy spectrum characteristic of the material of said radioactive source, comprising, in combination, means for irradiating a test sample to be measured with particles from said source, detecting and translating means normally intercepting all the particles which pass through said test sample to produce an electrical signal proportional to the number of such particles, time-varying deflection means operative on said particles differentially to change the trajectory of individual ones of said particles, said deflection means producing a predetermined maximum deflection force so that only those ones of said particles having an energy level above a predetermined energy level always impinge upon said detecting and translating means and those ones of said particles having an energy level lower than said predetermined energy level impinge upon said detecting and translating means periodically to produce in the output of said detecting and translating means two components, the first of said components being engendered by those ones of said particles having an energy level higher than said predetermined energy level and the remaining component being an alternating electrical signal superimposed on said first of said components, and means for separating said components into separate electrical signals to actuate measuring means.

5. Apparatus utilizing beta particles for measuring materials comprising, a radioactive source, means for forming a beam of beta particles from said source, the energy of individual ones of said beta particles being distributed about a mean value of energy characteristic of the material of said radioactive source, means for subjecting said beam to a transverse time-varying electromagnetic field to deflect each of said beta particles an amount proportional to the instantaneous strength of said electromagnetic field and inversely proportional to the energy of said particles, means sequentially supporting a material to be measured and a detector of beta particles in the path of said beam, said detector intercepting substantially all the beta particles passing through said material when the instantaneous strength of said electromagnetic field is zero and a portion of said beta particles passing through said material when the strength of said electromagnetic field differs from zero to produce an electric signal having a time-varying and a steady component, and means cooperating with said detector to separate said time-varying and said steady component to actuate separate output devices.

6. In a measuring system utilizing a beam of sub-atomic particles having differing energy levels, a modulator and detector to separate and detect sub-atomic particles having different energy levels comprising, an ionization detector, means directing said beam to said ionization detector and means deflecting individual ones of said sub-atomic particles, said last named means including a pair of electromagnets disposed transversely to said beam, a time-varying current source, and means connecting said time-varying current source to said pair of electromagnets to create a time-varying electromagnetic field therebetween periodically to deflect said sub-atomic particles in accordance with the energy level of each of said particles whereby only those ones of said sub-atomic particles having an energy level higher than a predetermined level are always directed to said ionization detector.

7. Apparatus for measuring a physical characteristic of a material by irradiating said material with a beam of beta particles, individual ones of the beta particles in said beam having different energy levels characteristic of the source of said beam, and detecting the number of beta particles passing through said material, comprising, means operative on said beam periodically and differentially to deflect individual ones of the beta particles therein, means for energizing said deflection means simultaneously at two different frequencies, means supporting said material in position to be irradiated by said beam, detecting and translating means disposed to intercept time-varying numbers of beta particles passing through said material to produce a time-varying electric current, and means for actuating output devices in accordance with the mean value of the different frequency components of said time-varying electric current.

References Cited in the file of this patent
UNITED STATES PATENTS

| | | |
|---|---|---|
| 2,488,269 | Clapp | Nov. 15, 1949 |
| 2,582,981 | Fua | Jan. 22, 1952 |
| 2,642,535 | Schroeder | June 15, 1953 |